United States Patent
Rasmussen et al.

(10) Patent No.: US 8,621,600 B2
(45) Date of Patent: *Dec. 31, 2013

(54) NON-INTRUSIVE BACKGROUND SYNCHRONIZATION WHEN AUTHENTICATION IS REQUIRED

(75) Inventors: David J. Rasmussen, Redmond, WA (US); Ilya Koulchin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 75 days.

This patent is subject to a terminal disclaimer.

(21) Appl. No.: 12/980,034

(22) Filed: Dec. 28, 2010

(65) Prior Publication Data

US 2011/0093948 A1 Apr. 21, 2011

Related U.S. Application Data

(63) Continuation of application No. 11/360,155, filed on Feb. 23, 2006, now Pat. No. 7,877,797.

(51) Int. Cl.
*H04L 9/32* (2006.01)
(52) U.S. Cl.
USPC .............................................. 726/17; 726/19
(58) Field of Classification Search
USPC ........ 726/9, 26, 27, 28, 29, 22; 713/224, 201, 713/212, 213, 220, 223; 380/200, 201, 202, 380/203, 277; 709/204, 201, 220, 227
See application file for complete search history.

(56) References Cited

U.S. PATENT DOCUMENTS

| | | | |
|---|---|---|---|
| 5,825,358 A | 10/1998 | Silvent et al. | 345/340 |
| 5,887,065 A | 3/1999 | Audebert | 380/23 |
| 6,408,306 B1 | 6/2002 | Byrne et al. | 707/104 |
| 6,456,304 B1 | 9/2002 | Angiulo et al. | 345/779 |
| 6,853,390 B1 | 2/2005 | Wandersleben et al. | 345/802 |
| 6,976,077 B1 | 12/2005 | Lehew et al. | 709/229 |

(Continued)

FOREIGN PATENT DOCUMENTS

CA 2 495 445 7/2005

OTHER PUBLICATIONS

Marshall, A., "Federated, Secure Trust Networks for Distributed Healthcare IT Services: A Comparative Study of Biometrics and Their Application in a Web Based Healthcare Environment", A Thesis in TCC 402 Presented to the Faculty of the School of Engineering and Applied Science University of Virginia, Mar. 23, 2004, pp. 1-29.

(Continued)

*Primary Examiner* — Jeffrey Pwu
*Assistant Examiner* — Nega Woldemariam
(74) *Attorney, Agent, or Firm* — Merchant & Gould

(57) ABSTRACT

A non-modal notification user interface element is displayed persistently but unobtrusively such that a user may easily determine that authentication credentials are required by a background synchronization process. The non-modal notification is configured such that it may be ignored by the user such that their workflow is not interrupted. The background synchronization continues to synchronize the data it can even though the background synchronization may require authentication credentials for a subset of the data to be synchronized. The user may select the non-modal notification user interface element at any point in time in order to supply the required authentication credentials. The non-modal notification is removed from the display when there are no further authentication credentials required.

20 Claims, 6 Drawing Sheets

(56) References Cited

U.S. PATENT DOCUMENTS

| | | | |
|---|---|---|---|
| 2002/0051017 A1* | 5/2002 | Wishoff | 345/774 |
| 2002/0129053 A1 | 9/2002 | Chan et al. | 707/503 |
| 2004/0054711 A1* | 3/2004 | Multer | 709/201 |
| 2004/0088546 A1 | 5/2004 | Shah et al. | 713/168 |
| 2005/0108579 A1 | 5/2005 | Isaacson et al. | 713/202 |
| 2005/0204130 A1 | 9/2005 | Harris | 713/165 |
| 2006/0282903 A1 | 12/2006 | Jung et al. | 726/27 |
| 2006/0294196 A1 | 12/2006 | Feirouz et al. | 709/217 |
| 2006/0294390 A1 | 12/2006 | Navratil et al. | 713/182 |
| 2007/0022015 A1 | 1/2007 | Tarinelli et al. | 705/26 |
| 2007/0073899 A1* | 3/2007 | Judge et al. | 709/246 |

OTHER PUBLICATIONS

"Fetch 3.0: FTP Client Software for the Apple Macintosh", Dartmouth College, 1995, pp. 1-38.

* cited by examiner

NON-INTRUSIVE BACKGROUND SYNCHRONIZATION WHEN AUTHENTICATION IS REQUIRED

RELATED APPLICATIONS

This application is a continuation of and claims priority to application Ser. No. 11/360,155, filed Feb. 23, 2006, entitled NON-INTRUSIVE BACKGROUND SYNCHRONIZATION WHEN AUTHENTICATION IS REQUIRED, issued as U.S. Pat. No. 7,877,797, incorporated herein by reference

BACKGROUND

Applications that require authentication when synchronizing data generally follow one of three models. The first model prompts the user to enter authentication credentials whenever authentication is required. The second model requires the user to save authentication credentials somewhere with the client application such that the application can handle authentication tasks without prompting the user. The third model simply fails and does not synchronize the data if authentication is required. None of these models is desirable. The first model can be very annoying and intrusive to the users workflow if background synchronizing is frequent. The second model may have security concerns since passwords are being saved. The third model results in the user not having data that is synchronized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

When authentication is required a notification user interface element is displayed persistently but unobtrusively such that a user is notified that at least one authentication credential is required by a background synchronization process. This notification element is displayed such that it may be ignored by the user and does not interfere with the user's workflow. The background synchronization process continues to attempt to synchronize data even when the notification element is displayed. The user may select the notification element at any point in order to supply one or more of the required authentication credentials. The notification element is removed from the display when there are no further authentication credentials required.

DETAILED DESCRIPTION

Figure 1:
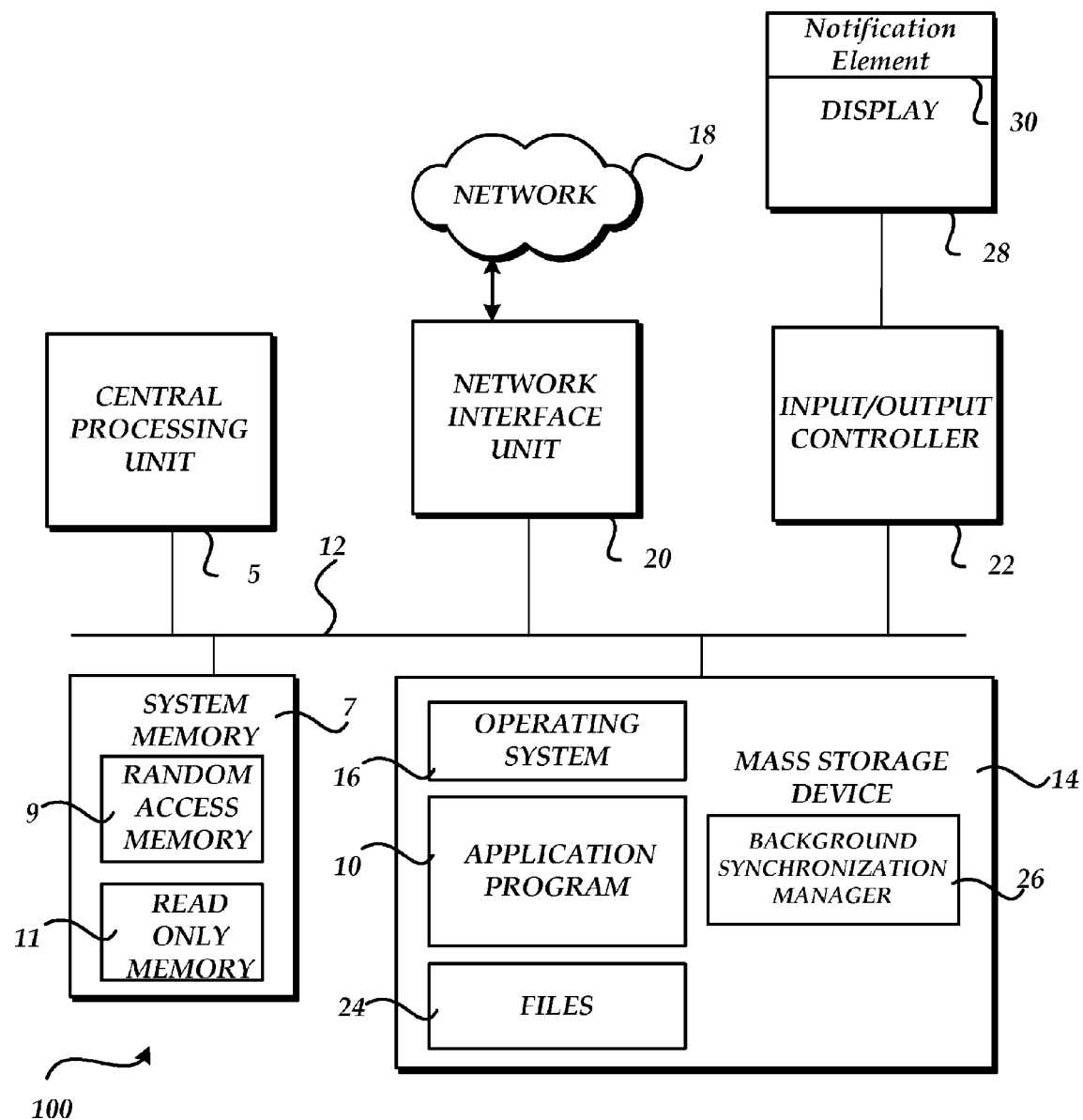
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store an application program 10. The application program 10 is operative to provide background synchronization of data. According to one embodiment, the application program 10 comprises the MICROSOFT ONENOTE application program from MICROSOFT CORPORATION. Other application programs that utilize background synchronization from other manufacturers may also be utilized. For instance, email programs, desktop publishing programs, presentation programs, and any other type of program that provides for background synchronization may be utilized.

The application program 10 may utilize a background synchronization manager 26. Although background synchronization manager 26 is shown separate from application program 10, it may be included within application program 10. As will be described in greater detail below, the background synchronization manager 26 may be used to assist in determining when the synchronization requires authentication credentials as well as persistently, but unobtrusively, displaying a notification element 30 when authentication credentials are required by the synchronization process.

Figure 2:
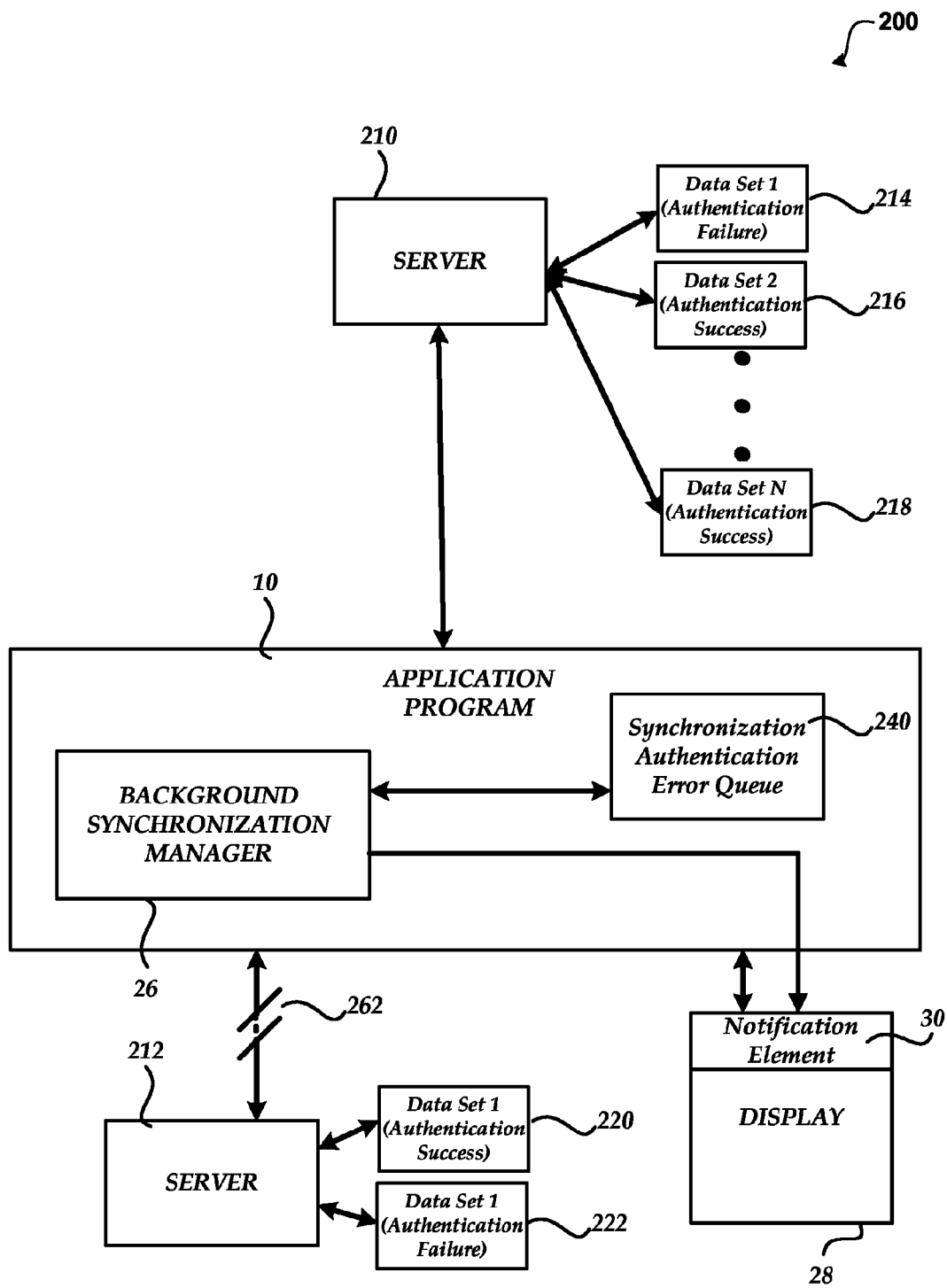
FIG. 2 shows a background synchronization system.

FIG. 2 shows a background synchronization system 200. As illustrated, background synchronization system 200 includes application program 10, background synchronization manager 26, synchronization authentication failure queue 240, servers 210 and 212, data sets (214, 216, 218, 220 and 222), display 28 and notification element 30.

As described briefly above, the background synchronization manager 26 provides background synchronization services for application 10. While application program 10 is asynchronously synchronizing data in the background it may not be able to authenticate against a server or unlock a data set without authentication credentials. As illustrated in system 200, application program 10 is configured to synchronize data sets 214, 216 and 218 through server 210 and data sets 220 and 222 through server 212. For exemplary purposes, the background synchronization of data set 214 through server 210 and the background synchronization of data set 222 through server 212 failed due to an authentication error. An authentication error occurs when the server requires authentication credentials that were either not supplied or are invalid. For example, an authentication error occurs when no authentication credentials are supplied to access a data set that requires a user name and a password. The authentication credentials may comprise one or more credentials. For instance, a single password may be required, a password and a user name may be required, and the like.

When application program 10 attempts to connect to a server (e.g. server 210 and/or 212) to synchronize data, the notification element 30 is displayed when the data to be synchronized fails due to an authentication error. Notification element 30 notifies the user that they need to enter authentication credentials (e.g. a password) to successfully synchronize the data that is protected by the authentication credentials. The notification element 30 is displayed unobtrusively, but persistently, such that the user's work flow is not interrupted. According to one embodiment, notification element 30 is displayed within an information bar at the top of an application window within display 28. According to one embodiment, the notification element 30 is a non-modal user interface element that is persistently displayed until there are no further authentication credentials required. According to one embodiment, the user may select the notification element 30. When selected, one or more authentication dialogs is displayed to receive the authentication credentials from the user. Should all of the required authentication credentials be entered correctly, the notification element 30 is removed from display 28.

Synchronization authentication error queue 240 is configured to store the outstanding authentication errors. Each time an authentication error occurs and an authentication error is received by application program 10, queue 240 is updated with the error. Whenever the authentication error queue has one or more authentication errors the background synchronization manager 26 displays the notification element 30 on display 28. According to one embodiment, the same message is displayed within notification element 30 regardless of the number of authentication errors. Keeping the message constant within notification element 30 helps to ensure that the message is unobtrusive and does not interfere with the user's workflow. Alternatively, the message may be changed. For example, the message may indicate the number of authentication errors and/or the number of authentication credentials that are required.

Each time that application 10 fails a background synchronization of a data set due to one or more required authentication credentials that were not provided or were incorrect, queue 240 is updated. If the error was a server authentication error then background synchronization manager 26 checks to see if an error for the data associated with the server has already been entered into queue 240. If an authentication error already exists for this data in queue 240 then the authentication error is not added to the queue 240. If the authentication error has not been previously received, then the authentication error is placed in queue 240. When authentication succeeds against a server, and there is an authentication error in the queue due to a previous error, then that error is removed from the queue.

According to one embodiment, when a server temporarily goes offline, as indicated by link 262, any authentication errors that may exist in queue 240 that relate to the offline server are removed from the queue. In the present example, any authentication errors relating to server 212 would be removed from queue 240 when link 262 is broken. The authentication errors are removed since the user can not correct any authentication errors relating to that server until the server comes back online. When the server is available again, any authentication errors that occur are added to the queue again.

When the user selects the notification element 30, the background synchronization manager 26 accesses queue 240 to determine the authentication failures to present to the user for correction. According to one embodiment, each authentication error is handled one at a time. In other words, the user is presented with an input box to enter the authentication credentials that are required for each error. According to another embodiment, an input box may be displayed to the user that combines input fields for entering authentication credentials for more than one of the authentication errors.

Figure 3:
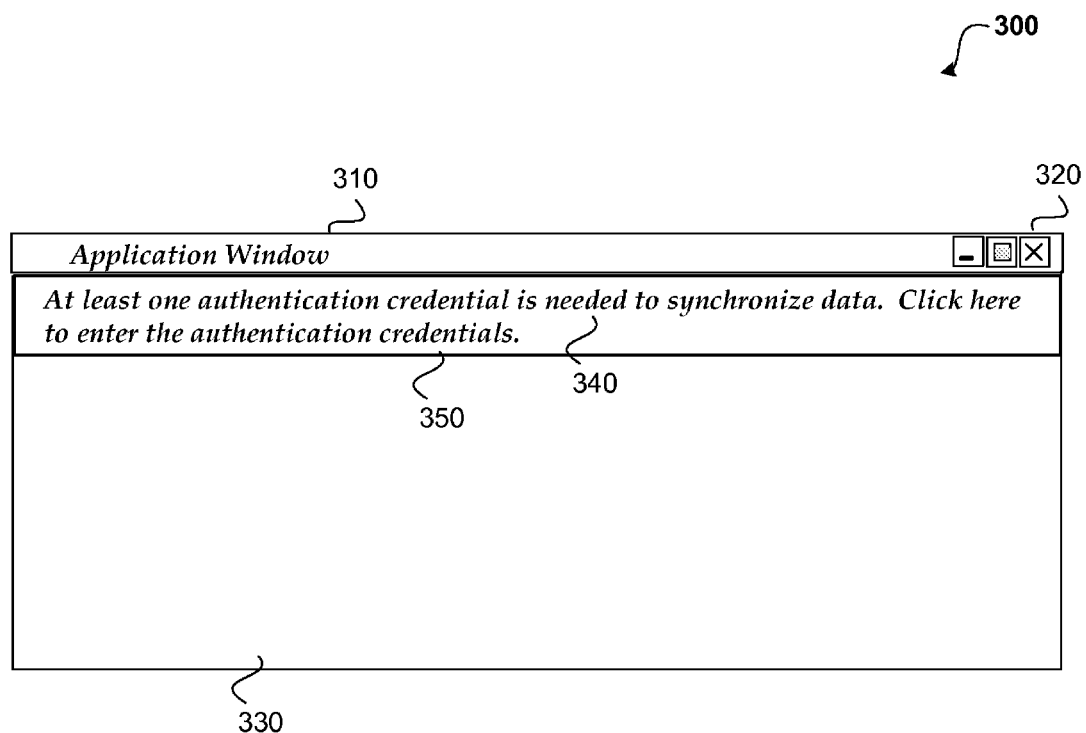
FIG. 3 illustrates an exemplary application window with a notification element.

FIG. 3 illustrates an exemplary application window 300 with a notification element. As illustrated, FIG. 3 includes application window 310, window elements 320, display area 330 and notification element 350 that includes message 340.

According to one embodiment, notification element 350 is displayed at the top of the display area 330 of the application window 310. Displaying the notification element 350 at the top of display area 330 helps to ensure that the user will notice the message 340 indicating that authentication credentials are required to synchronize data. Message 340 indicates that at least one authentication credential is required to synchronize data. Message 340 also indicates that the user may select the notification element 350 in order to enter the required authentication credentials.

Figure 4:
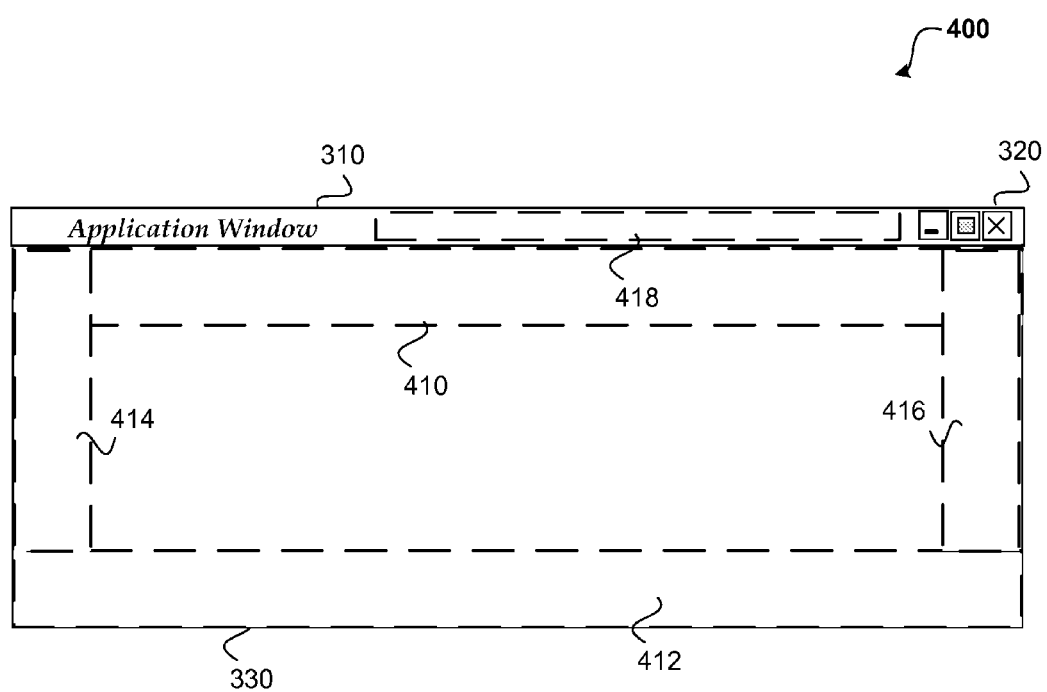
FIG. 4 shows another exemplary application window with various areas to display a notification element.

FIG. 4 shows another exemplary application window 400 with various areas to display a notification element. As illustrated, FIG. 4 includes application window 310, window elements 320, display area 330 and notification element display areas 410, 412, 414, 416 and 418 for displaying a notification element that indicates that authentication credentials are required. The notification element may be shown in many areas of display area 330 including the title bar (412), the upper portion (410), the lower portion (412), the right hand side (416) and the left hand side (414) of display area 330. Other locations may be chosen such that the user may easily determine that authentication credentials are required.

Figure 5:
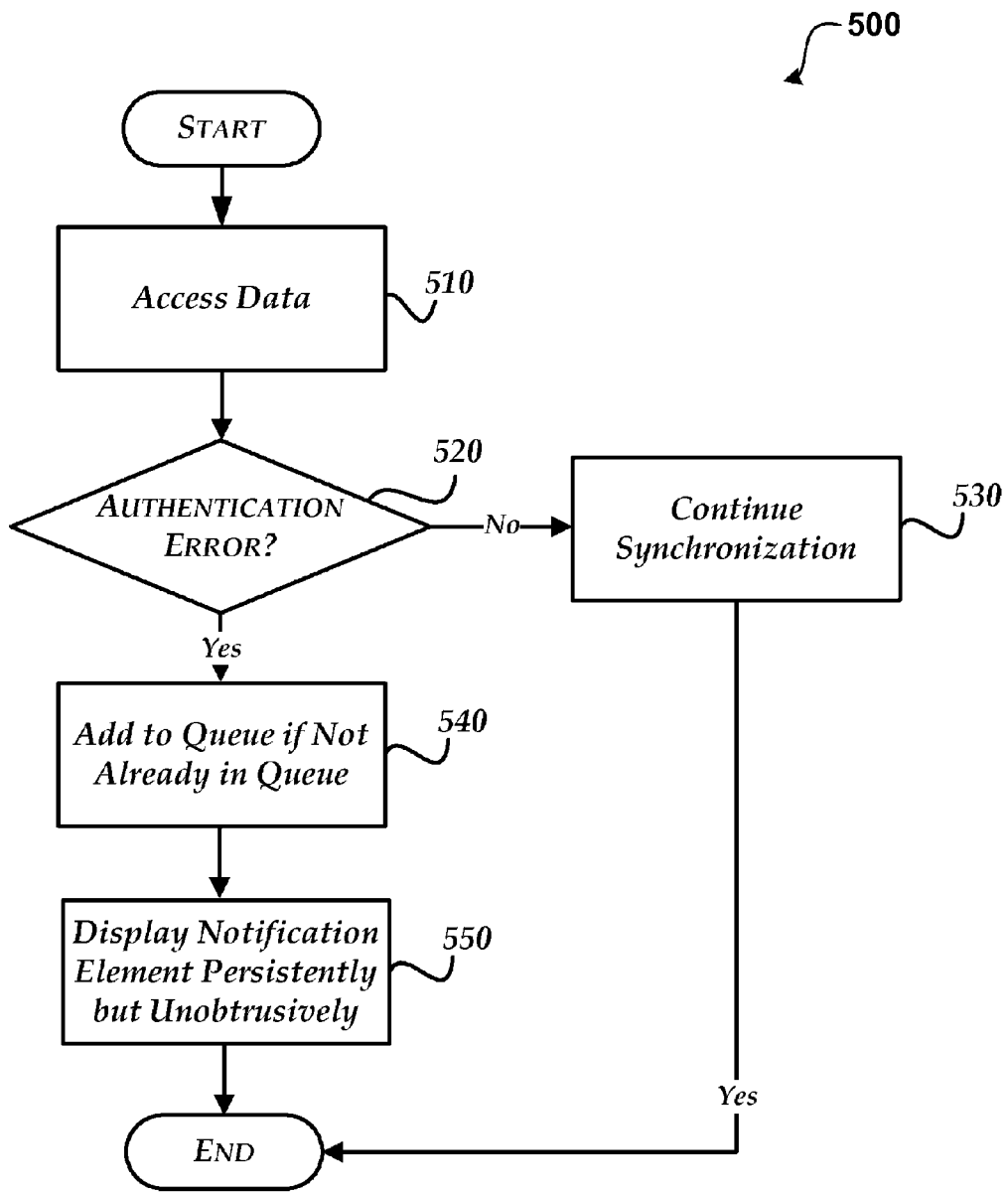
FIG. 5 illustrates displaying a notification element as a result of an authentication error.
Figure 6:
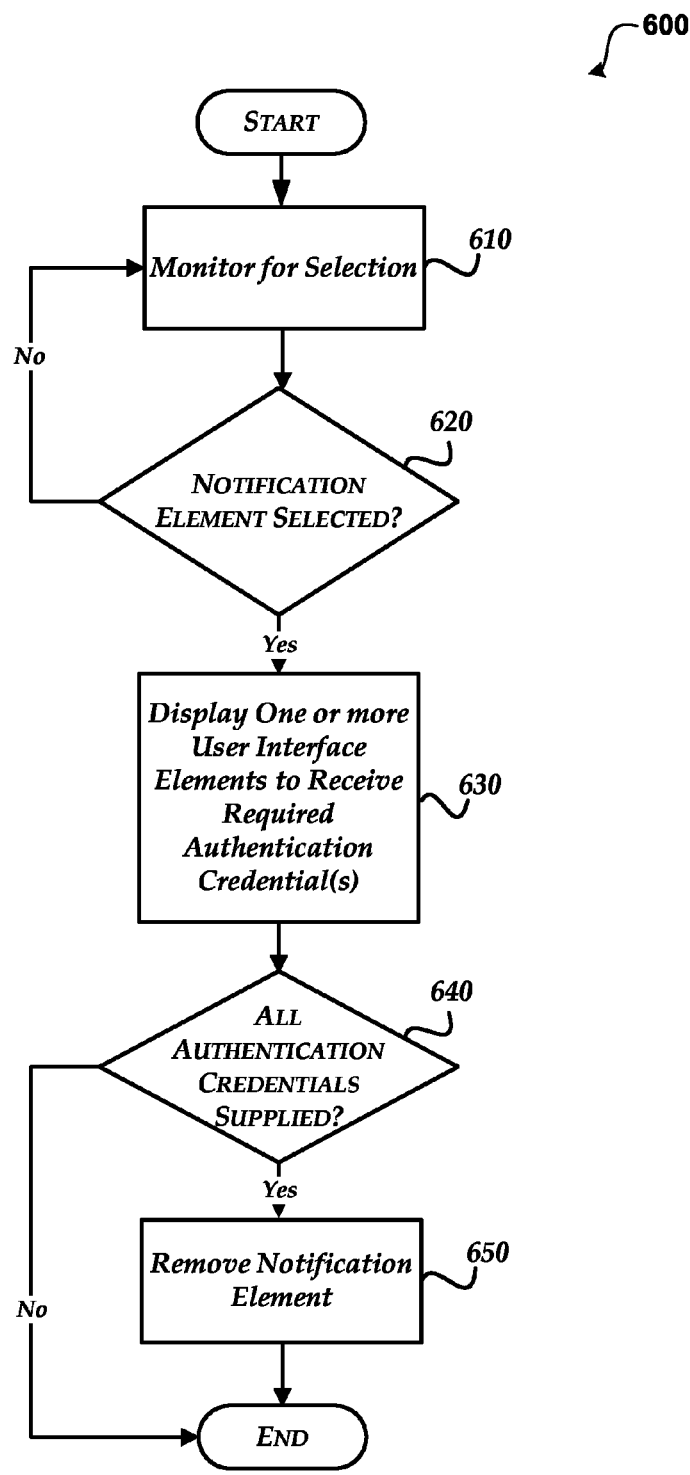
FIG. 6 illustrates a process for interacting with a notification element that is displayed as a result of an authentication error.

Referring now to FIGS. 5 and 6, an illustrative process for providing a notification element will be described. Although the embodiments described herein are presented in the context of a background synchronization manager 26 and an application program 10, other types of application programs that use background synchronization requiring authentication credentials may be utilized. For instance, the embodiments described herein may be utilized within an email program, a web browser program, and the like.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 5 illustrates displaying a notification element as a result of an authentication error.

After a start operation, the process flows to operation 510, where the background synchronization process attempts to access data that is to be synchronized.

Flowing to decision operation 520, a determination is made as to whether there was an authentication error as a result of attempting to access the data at operation 510. When there is not an authentication error, the process flows to operation 530 where the synchronization process continues.

When there is an authentication error, the process moves to operation 540 where the authentication error is added to an authentication error queue. According to one embodiment, the authentication error is only added to the queue if the authentication error is a new authentication error that is not currently in the queue. Additionally, instead of placing the authentication error within a queue, the error may be stored in some other manner. For example, the authentication error may be maintained somewhere in memory, within a file, and the like.

The process then moves to operation 550 where the notification element is displayed persistently but unobtrusively. A notification element is displayed as long as the queue contains any authentication errors.

The process then moves to an end operation and returns to processing other actions.

FIG. 6 illustrates a process for interacting with a notification element that is displayed as a result of an authentication error.

After a start operation, the process flows to operation 610, where the notification element is monitored for selection. According to one embodiment, this involves determining when the notification element receives a mouse click. Any type of selection of the notification element, however, may be utilized.

Flowing to decision operation 620, a determination is made as to whether the notification element is selected. When the notification element is not selected, the process returns to operation 610 for continued monitoring.

When the notification element is selected, the process moves to operation 630 where one or more user interface elements are displayed to receive the required authentication credentials.

The process then moves to decision operation 640 where a determination is made as to whether all of the required authentication credentials have been received. When all of the authentication credentials have not been received, the notification element continues to be displayed and the process moves to an end operation.

When all of the authentication credentials have been received, the process moves to operation 650 where the notification element is removed from the display.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for non-intrusive background synchronization, comprising:
   performing a background synchronization of data sets relating to a user;
   while performing the background synchronization of data sets, determining when an authentication error relating to an authentication credential for the user is received in response to an attempt to synchronize any of the data sets;
   in response to receiving the authentication error, displaying a non-modal notification element indicating that information is required for the background synchronization to synchronize the data relating to the any of the data sets receiving the authentication error;
   stopping the background synchronization of the data relating to the any of the data sets receiving the authentication error while continuing the background synchronization process for synchronizing the other data sets not receiving the authentication error; and
   in response to receiving a selection of the non-modal notification element and receiving the information to address the authentication error, resuming the background synchronization of the data relating to the any of the data sets receiving the authentication error.

2. The method of claim 1, wherein the information identifies the authentication credential.

3. The method of claim 1, further comprising storing the authentication error within a queue.

4. The method of claim 3, further comprising storing the authentication error within the queue until an authentication credential is received and is verified.

5. The method of claim 3, further comprising removing the authentication error from the queue when a server used in synchronizing the one of the data sets for which the authentication error becomes unavailable.

6. The method of claim 3, wherein storing the authentication error within the queue comprises determining when the authentication error has been previously received.

7. The method of claim 5, wherein the background synchronization of the data sets is performed at least two servers, wherein at least one of the data sets is synchronized by a first server and at least another one of the data sets is synchronized by a second server.

8. The method of claim 1, wherein displaying the non-modal notification element comprises displaying the non-modal notification element within an application window that is currently displayed.

9. The method of claim 1, further comprising monitoring the non-modal notification element for a selection and displaying a user interface element that is configured to receive the authentication credential when the non-modal notification element is selected.

10. A computer-readable medium having computer-executable instructions encoded on a memory for non-intrusive background synchronization, comprising:
performing a background synchronization of data sets associated with a user;
determining when an authentication error is received in response to an attempt to synchronize one of the data sets;
displaying a non-modal notification element indicating that an authentication credential is required for the background synchronization to synchronize the one of the data sets;
stopping the background synchronization of the one of the data sets until information is received to resolve the authentication error while continuing the background synchronization process for synchronizing the other data sets not receiving the authentication error that are associated with the user; and
in response to receiving a selection of the non-modal notification element and receiving the information to address the authentication error, resuming the background synchronization of the one of the data sets.

11. The computer-readable medium of claim 10, further comprising storing the authentication error within a queue until an authentication credential is received and is verified.

12. The computer-readable medium of claim 11, further comprising removing the authentication error from the queue when a server used in synchronizing the one of the data sets for which the authentication error becomes unavailable.

13. The computer-readable medium of claim 11, wherein storing the authentication error within the queue comprises determining when the authentication error has been previously received.

14. The computer-readable medium of claim 10, wherein the background synchronization of the data sets is performed at least two servers, wherein at least one of the data sets is synchronized by a first server and at least another one of the data sets is synchronized by a second server.

15. The computer-readable medium of claim 10, wherein displaying the non-modal notification element comprises displaying the non-modal notification element within an application window that is currently displayed.

16. The computer-readable medium of claim 10, further comprising monitoring the non-modal notification element for a selection and displaying a user interface element that is configured to receive the authentication credential when the non-modal notification element is selected.

17. A system for non-intrusive background synchronization, comprising:
a processor and a computer-readable medium;
an operating environment stored on the computer-readable medium and executing on the processor;
a display; and
an application operating under the control of the operating environment and operative to perform actions, including:
performing a background synchronization of data sets associated with a user;
determining when an authentication error is received in response to an attempt to synchronize one of the data sets;
storing the authentication error in a storage;
displaying a non-modal notification element on the display indicating that an authentication credential is required for the background synchronization to synchronize the one of the data sets;
stopping the background synchronization of the one of the data sets until information is received to resolve the authentication error at which point the background synchronization of the one of the data sets continues; and
continuing the background synchronization process for synchronizing the other data sets not receiving the authentication error.

18. The system of claim 17, further comprising removing the authentication error from storage when a server used in synchronizing the one of the data sets for which the authentication error becomes unavailable.

19. The system of claim 17, wherein displaying the non-modal notification element comprises displaying the non-modal notification element within an application window that is currently displayed.

20. The system of claim 17, further comprising monitoring the non-modal notification element for a selection and displaying a user interface element that is configured to receive the authentication credential when the non-modal notification element is selected.

* * * * *